United States Patent
Kozorovitskiy et al.

(10) Patent No.: US 12,105,270 B2
(45) Date of Patent: Oct. 1, 2024

(54) LOW NUMERICAL APERTURE LENS BASED OBLIQUE PLANE ILLUMINATION IMAGING

(71) Applicant: Northwestern University, Evanston, IL (US)

(72) Inventors: Yevgenia Kozorovitskiy, Evanston, IL (US); Manish Kumar, Evanston, IL (US)

(73) Assignee: Northwestern University, Evanston, IL (US)

( * ) Notice: Subject to any disclaimer, the term of this patent is extended or adjusted under 35 U.S.C. 154(b) by 578 days.

(21) Appl. No.: 17/426,012

(22) PCT Filed: Jan. 28, 2020

(86) PCT No.: PCT/US2020/015327
§ 371 (c)(1),
(2) Date: Jul. 27, 2021

(87) PCT Pub. No.: WO2020/159931
PCT Pub. Date: Aug. 6, 2020

(65) Prior Publication Data
US 2022/0128806 A1    Apr. 28, 2022

Related U.S. Application Data

(60) Provisional application No. 62/797,997, filed on Jan. 29, 2019.

(51) Int. Cl.
G02B 21/00      (2006.01)
G02B 21/02      (2006.01)
(Continued)

(52) U.S. Cl.
CPC ..... *G02B 21/0032* (2013.01); *G02B 21/0048* (2013.01); *G02B 21/0076* (2013.01);
(Continued)

(58) Field of Classification Search
CPC ............ G02B 21/0032; G02B 21/0048; G02B 21/0076; G02B 21/008; G02B 21/02;
(Continued)

(56) References Cited

U.S. PATENT DOCUMENTS 8,059,336 B2    11/2011    Ptitsyn et al.
9,310,186 B2    4/2016     Abdulhalim et al.
(Continued)

FOREIGN PATENT DOCUMENTS

DE    102019214929 A1 *  4/2021  ......... G02B 21/0032
WO    WO 2008/146226 A1   12/2008

OTHER PUBLICATIONS

The International Search Report and the Written Opinion issued on Jun. 9, 2020 for International Patent Application No. PCT/US20/15327; pp. 1-11.

(Continued)

*Primary Examiner* — Arnel C Lavarias
(74) *Attorney, Agent, or Firm* — Bell & Manning, LLC

(57) ABSTRACT

An imaging system includes a first finite conjugate objective at a frontal end of the system and a second finite conjugate objective at a distal end of the system. The system also includes a beam splitting or merging element positioned between the first finite conjugate objective and the second finite conjugate objective. The system also includes an excitation unit configured to direct an excitation beam into a sample positioned in front of the first finite conjugate objective. The excitation beam is in the form of an excitation plane. The system also includes an image sensor positioned facing the second finite conjugate objective. The image sensor lies in a conjugate plane of an excitation beam illumination plane at the frontal end of the system.

9 Claims, 14 Drawing Sheets

(51) Int. Cl.
  *G02B 21/36* (2006.01)
  *G02B 27/10* (2006.01)
  *G02B 27/14* (2006.01)
  *G03B 21/60* (2014.01)
  *G06T 3/02* (2024.01)
  *G06T 15/08* (2011.01)
  *H04N 25/53* (2023.01)

(52) U.S. Cl.
  CPC ........... *G02B 21/008* (2013.01); *G02B 21/02* (2013.01); *G02B 21/364* (2013.01); *G02B 27/1006* (2013.01); *G02B 27/141* (2013.01); *G03B 21/60* (2013.01); *G06T 3/02* (2024.01); *G06T 15/08* (2013.01); *H04N 25/53* (2023.01)

(58) Field of Classification Search
  CPC .............. G02B 21/364; G02B 27/1006; G02B 27/141; G02B 21/00; G02B 21/0004; G02B 21/002; G02B 21/0036; G02B 21/0052; G02B 21/006; G02B 21/06; G02B 21/36; G02B 21/361; G02B 21/367; G03B 21/60; G01N 21/6456; G01N 21/6458; G01N 2021/6463; G01N 2021/6465; G01N 21/6486; G06T 3/02; G06T 15/08; H04N 25/53

USPC ....... 359/369, 362, 363, 368, 385, 388, 389, 359/390, 433, 434, 435
  See application file for complete search history.

(56) References Cited

U.S. PATENT DOCUMENTS

2018/0373017 A1   12/2018   Dixon
2019/0324244 A1   10/2019   Kozorovitskiy et al.
2024/0045195 A1*   2/2024   Dunsby ............... G02B 21/361

OTHER PUBLICATIONS

Kumar, M. et al., "Integrated one-and two-photon scanned oblique plane illumination (SOPi) microscopy for rapid volumetric imaging;" Optics Express, vol. 26, No. 10; Publication [online]. May 14, 2018 [retrieved Mar. 23, 2020]. Retrieved from the Internet: ,URL: https://www.ncbi.nlm.nih.gov/pmc/articles/PMC6005676/pdf/oe-26-10-13027.pdf.; pp. 13027-13041, see specifically figures 1a-b; p. 13030, section 2.1 to p. 13033, section 2.2, paragraph 2.

* cited by examiner

| NA | Resolution (Rayleigh criterion) (μm) | Oblique plane tilt w.r.t. axis (max.) | System NA | System resolution (μm) |
|---|---|---|---|---|
| 0.3 | 1.06 | 13° | 0 | -- |
| 0.5 | 0.63 | 22° | 0 | -- |
| 0.7 | 0.45 | 31.7° | 0.06 | 5.28 |
| 1.0 | 0.32 | 48.7° | 0.63 | 0.50 |

Fig. 2

LOW NUMERICAL APERTURE LENS BASED OBLIQUE PLANE ILLUMINATION IMAGING

CROSS-REFERENCE TO RELATED APPLICATION

This application is a National Stage of International Application No. PCT/US2020/015327, filed Jan. 28, 2020, which claims the priority benefit of U.S. Patent Application No. 62/797,997, filed Jan. 29, 2019, the entire contents of which are incorporated herein by reference.

BACKGROUND

Single front-facing microscope objective based oblique plane illumination imaging and microscopy is a powerful imaging technique that allows for steric access to the sample being imaged. Traditional objective based oblique plane illumination image systems typically include three high numerical aperture (NA) objectives placed sequentially along the imaging path, where last two objectives are placed at an angle to each other to enable imaging of the oblique intermediate image.

SUMMARY

An illustrative imaging system includes a first finite conjugate objective at a frontal end of the system and a second finite conjugate objective at a distal end of the system. The system also includes a beam splitting or merging element positioned between the first finite conjugate objective and the second finite conjugate objective. The system also includes an excitation unit configured to direct an excitation beam into a sample positioned in front of the first finite conjugate objective. The excitation beam is in the form of an excitation plane. The system also includes an image sensor positioned facing the second finite conjugate objective. The image sensor lies in a conjugate plane of an excitation beam illumination plane at the frontal end of the system.

In an illustrative embodiment, the first finite conjugate objective and the second finite conjugate objective have a low numerical aperture. Also, the beam splitting or merging element can be a cube beam splitter or a plate beam splitter with excitation and emission filters. The beam splitting or merging element can also be a dichroic beam splitter which allows only a fluorescence emission beam to pass through to the distal end of the system. The excitation unit can include any combination of a laser or laser diode, a beam expander, a slit aperture, and a cylindrical lens to shape the excitation beam into a planar excitation beam. Alternatively, the excitation unit can include any combination of a laser, a galvanometer mounted planar-mirror based scanner, and a converging lens to form a planar excitation beam. The excitation unit emits the excitation beam at an inclined angle such that resultant illumination is an oblique plane, tilted with respect to a principal axis of the first finite conjugate objective. A tilt angle of the excitation beam and the image sensor can be matched such that the image sensor is able to image an entire illuminated plane at the same time.

The image sensor can be a two-dimensional (2D) light detector array which acquires 2D images through a global shutter mechanism or through a rolling shutter mechanism while the image sensor is statically positioned. The system can also include a translation stage to hold the sample, where the translation stage moves the sample in a direction perpendicular to the principal axis of the first finite conjugate objective such that the sample can be moved to form an image from neighboring optical slices which can be stitched together to form a three-dimensional image of the sample. The system can also include a computing system configured to apply an Affine transformation on a stack of acquired images, where application of the Affine transformation is based on a tilt angle of the excitation plane.

An imaging system in accordance with a second embodiment includes a magnifying unit positioned at a frontal end of the system, where the magnifying unit includes a first infinity corrected objective and a first tube lens. The system also includes a de-magnifying unit positioned at a distal end of the system, where the de-magnifying unit includes a second infinity corrected objective and a second tube lens. The system also includes a beam splitting or merging element positioned in between the first infinity corrected objective and the second infinity corrected objective. The system also includes an excitation unit configured to direct an excitation beam into a sample positioned in front of the first infinity corrected objective, where the excitation beam is in the form of an excitation plane. The system also includes an image sensor positioned directly in front of the second infinity corrected objective such that the image sensor lies in a conjugate plane of the excitation plane.

In an illustrative embodiment, the first infinity corrected objective and the second infinity corrected objective have a low numerical aperture. Also, the beam splitting or merging element can be a cube beam splitter or a plate beam splitter with excitation and emission filters. Alternatively, the beam splitting or merging element can be a dichroic beam splitter which allows only a fluorescence emission beam to pass through to the distal end of the system. The beam splitting or merging element is positioned between the first infinity corrected objective and the first tube lens. Alternatively, the beam splitting or merging element is positioned between the first tube lens and the second tube lens. In another alternative embodiment, the beam splitting or merging element is positioned between the second tube lens and the second infinity corrected objective.

The excitation unit of the system can include any combination of a laser or laser diode, a beam expander, a slit aperture and a cylindrical lens to shape the excitation beam into a planar excitation beam. Alternatively, the excitation unit can include any combination of a laser, a galvanometer mounted planar-mirror based scanner, and a converging lens to form a planar excitation beam. The excitation unit emits the excitation beam either from an off-axis position or from an inclined position such that resultant illumination is an oblique plane that is tilted with respect to a principal axis of the first infinity corrected objective. Tilt angles of the excitation plane and the image sensor are matched such that the image sensor can image an entire portion of the excitation plane at the same time. The image sensor of the system can be a two-dimensional (2D) light detector array which acquires 2D images either through a global shutter mechanism or through a rolling shutter mechanism while the image sensor is statically positioned. The system can also include a translation stage that moves the sample in a direction perpendicular to an axis of the first infinity corrected objective such that the sample can be moved to form an image from neighboring optical slices which can be stitched together to form a three-dimensional image of the sample. The system can also include a computing system configured to apply an Affine transformation on a stack of acquired images to obtain an undistorted three-dimensional reconstruction of the sample, where application of the Affine transformation is based on a tilt angle of the excitation plane.

An imaging system in accordance with a third illustrative embodiment includes a magnifying unit at a frontal end of the system, where the magnifying unit includes a first infinity corrected objective and a first tube lens. The system also includes a de-magnifying unit at a distal end of the system, where the de-magnifying unit includes a second infinity corrected objective and a second tube lens. The system includes a scanning unit positioned between the magnifying unit and the de-magnifying unit, and a beam splitting or merging element positioned between the second tube lens and the second infinity corrected objective. The system also includes an excitation unit configured to emit an excitation beam into a sample positioned in front of the first infinity corrected objective, where the excitation beam is in the form of an excitation plane. The system further includes an image sensor positioned directly in front of the second infinity corrected objective such that the image sensor lies in a conjugate plane of the excitation plane.

In an illustrative embodiment, the first infinity corrected objective and the second infinity corrected objective have a low numerical aperture. The scanning unit can include a galvanometer mounted planar mirror positioned between two converging lenses such that an axis of rotation of the galvanometer mounted planar mirror matches focal planes of the two converging lenses. The magnifying unit at the frontal end, the scanning unit, and the de-magnifying unit at the distal end are stacked together sequentially to provide a net magnification which is the same along a lateral direction and an axial direction, and where the net magnification has a numerical value between 1 and 2. In one embodiment, the beam splitting or merging element includes a cube beam splitter or a plate beam splitter with excitation and emission filters. Alternatively, the beam splitting or merging element includes a dichroic beam splitter which allows only a fluorescence emission beam to pass through to the distal end of the system, and the beam splitting or merging element can be positioned between the tube lens and the second infinity corrected objective at the distal end of the system.

The excitation unit includes any combination of a laser or laser diode, a beam expander, a slit aperture, and a cylindrical lens to shape the excitation beam into a planar excitation beam. Alternatively, the excitation unit includes any combination of a laser, a galvanometer mounted planar-mirror based scanner, and a converging lens to form a planar excitation beam. The excitation unit emits the excitation beam from an off-axis position such that resultant illumination is an oblique plane tilted with respect to a principal axis of the first infinity corrected objective. Tilt angles of the excitation plane and the image sensor match such that the image sensor can image the entire excitation plane at the same time. The image sensor can be a two-dimensional (2D) light detector array that acquires 2D images either through a global shutter mechanism or through a rolling shutter mechanism without movement of the image sensor. Also, rotation of a planar mirror of the scanning unit gives rise to a constant tilt lateral shift in the excitation plane, and a de-scan of a received signal beam results in a static imaging plane at the distal end of the system such that the sample can be imaged while stationary. The system can also include a computing system configured to apply an Affine transformation on a stack of acquired images to obtain an undistorted three-dimensional reconstruction of the sample, where application of the Affine transformation is based on the tilt angle of the excitation plane.

An imaging system in accordance with a fourth illustrative embodiment includes a first set of optical elements including a first infinity corrected objective positioned at a frontal end of the system, a beam splitting or merging unit, an image relay and scan unit, and a second infinity corrected objective positioned at a distal end of the system. The system also includes a second set of optical elements including a third infinity corrected objective, a tube lens, and an image sensor. The system also includes a diffusive screen positioned between the first set of optical elements and the second set of optical elements. The system further includes an excitation unit configured to emit an excitation beam into a sample positioned along an axis of the beam splitting or merging unit, where the excitation beam is in the form of a planar excitation beam.

In an illustrative embodiment, a combination the first infinity corrected objective, the second infinity corrected objective, and the third infinity corrected objective has a low numerical aperture. Also, the image relay and scan unit can include a galvanometer mounted planar mirror positioned between two converging lenses such that an axis of rotation of the galvanometer mounted planar mirror exactly matches with focal planes of the two converging lenses. The first set of optical elements can be positioned between the sample and the diffusive screen to provide a net magnification which is the same along a lateral direction and an axial direction, and the net magnification can have a numerical value between 1 and 2. The diffusive screen acts as a projection screen and is made of scattering particles, where a size of the scattering particles either smaller than a resolving power of the system or is comparable to the resolving power of the system. In some embodiments, the diffusive screen is mounted on a moving rotor or vibration motor which allows for in-plane motion of the scattering particles to average out random particle images that overlay images of the sample.

The second set of optical elements form on the image sensor a magnified view of an intermediate image at the diffusive screen to allow for use of a large format image sensor. The beam splitting or merging unit can include a cube beam splitter or a plate beam splitter with excitation and emission filters in one embodiment. Alternatively, the beam splitting or merging unit includes a dichroic beam splitter that allows only a fluorescence emission beam to pass through to the distal end of the system, and the beam splitting or merging unit can be positioned between the tube lens and the third infinity corrected objective. In another embodiment, the beam splitting or merging unit includes a cube beam splitter, a plate beam splitter, or a dichroic mirror, and a fluorescence filter positioned between the diffusive screen and the image sensor to enable exact selection of a fluorescence emission.

In one embodiment, the excitation unit includes any combination of a laser or laser diode, a beam expander, a slit aperture, and a cylindrical lens to shape the excitation beam into the planar excitation beam. Alternatively, the excitation unit includes any combination of a laser, a galvanometer mounted planar-mirror based scanner, and a converging lens to form the planar excitation beam. The excitation unit emits the excitation beam from an off-axis position such that resultant illumination is an oblique plane tilted with respect to a principal axis of the first infinity corrected objective. A tilt angle of planar excitation beam, diffusive screen, and image sensor are exactly matched such that the image sensor is able to image an entire illuminated plane at the same time. The image sensor can be a two-dimensional (2D) light detector array which acquires 2D images either through a global shutter mechanism or through a rolling shutter mechanism without movement of the image sensor. Also, rotation of a planar mirror of the image relay and scan unit gives rise to a constant tilt lateral shift in an illuminating oblique plane, and a de-scan of a received signal beam results in a static imaging plane at the diffusive screen and on the image sensor without translation of the sample. The system can also include a computing system configured to apply an Affine transformation on a stack of acquired images to obtain an undistorted three-dimensional reconstruction of the sample, where application of the affine transformation is based on a tilt angle of the excitation plane.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 2 is a table that provides an estimate to net system numerical aperture (NA) and corresponding theoretical resolution for various choices of objectives in an oblique plane illumination imaging system.

DETAILED DESCRIPTION

Existing oblique plane imaging approaches use sequential arrangements of three high numerical aperture (NA) microscope objectives, leading to dramatic loss in NA from the oblique arrangement of last two objectives (i.e., a distal end of the microscope away from the sample being imaged). This leads to two major limitations: (1) low effective NA of the entire imaging system, and (2) restricting this class of light-sheet imaging techniques to high NA objectives alone (to partly compensate for the loss of NA). Described herein are methods and systems that overcome these limitations and that are able to perform oblique plane imaging with a selection of low NA objectives.

Figure 1B:
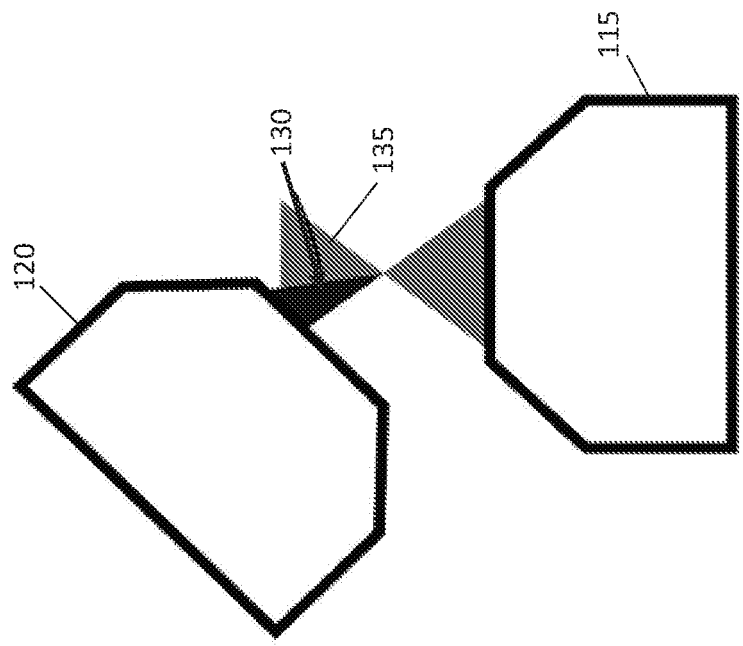
FIG. 1B is a partial view of a conventional oblique plane imaging setup that shows an acceptance cone between a second microscope objective and a third microscope objective of the system.
Figure 1A:
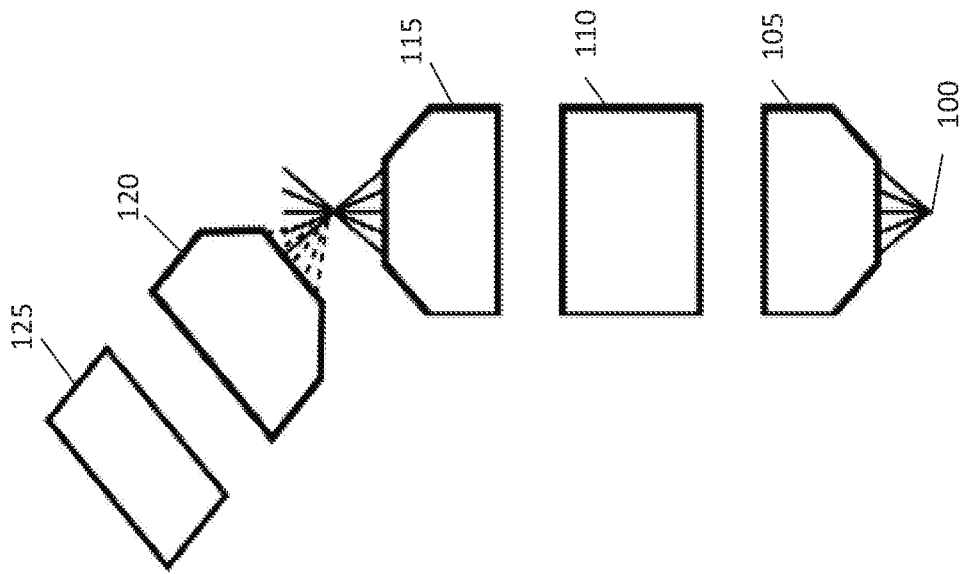
FIG. 1A depicts a conventional oblique plane imaging setup.

FIG. 1A depicts a conventional oblique plane imaging setup. The oblique plane imaging setup includes a first microscope objective 105, an image relay and scan unit 110, a second microscope objective 115, a third microscope objective 120, and a tube lens and camera 125. As shown, the first microscope objective 105 is proximate to a point object 100. FIG. 1B is a partial view of a conventional oblique plane imaging setup that shows an acceptance cone between the second microscope objective 115 and the third microscope objective 120. As shown in FIG. 1B, a net acceptance cone 130 of the system is smaller than the overall cone 135, which results in a loss in net NA for the system. This loss arises due to the oblique placement of the second microscope objective 115 and the third microscope objective 120 in the conventional system.

Solutions to the aforementioned technical problems with conventional oblique plane imaging systems can be found by approaches described herein, including: (1) removing the third objective from the oblique plane imaging systems and placing the image sensor directly at the intermediate image plane in front of second objective and/or (2) using a diffusive screen at the intermediate image plane after the second objective, and then using a third objective based magnifying system to re-image the illuminated sample plane on an image sensor. Both of these solutions are no longer restrictive in terms of objective NA and work with low NA objectives.

In one of the embodiments described herein, the third objective is removed from the oblique plane imaging system. The omission of one objective and corresponding supporting optics makes it possible to reduce the system size, and thus miniaturization of the whole system is achievable. In all of the embodiments described herein, the choice of low NA objectives reduces the overall system cost while still retaining the advantageous effects of oblique plane imaging which include steric access to the sample being imaged, a single front facing objective based light-sheet architecture, constant tilt scanning of an illuminating planar excitation beam, leading to true perspective three dimensional (3D) reconstruction of the scanned sample, etc.

Oblique plane imaging and microscopy is an approach for making use of a single front facing objective based setup to perform light-sheet microscopy. In traditional systems (e.g., FIG. 1A), an off-axis beam incident on the main objective provides an oblique illumination plane in the sample, the second objective forms an intermediate image of the oblique illumination plane, and the inclined third objective corrects for the tilt and forms a magnified final image on the image sensor. Variants of this oblique plane imaging setup have been suggested which either make use of an alternative illumination or scanning architecture to perform rapid 3D imaging of a sample. All of the existing variants of oblique plane imaging setups include the components as described in FIG. 1A.

As seen from FIGS. 1A and 1B, there is a dramatic loss in the net acceptance angle of the system at the interface between second and third objectives of the system. This inclined placement of third objective has traditionally been used because any attempt on increasing the system NA by co-aligning the third objective with the second objective would throw most of the image plane out of focus, with only the center line of the image remaining in focus on the image sensor. Due to this loss in system NA, it becomes mandatory in traditional systems to use high NA objectives in the oblique plane imaging setup. FIG. 2 is a table that provides an estimate to net system NA and corresponding theoretical resolution for various choices of objectives. For simplicity, all three objectives of the oblique plane imaging system are assumed to be of the same NA, and the wavelength of light is assumed to be 520 nanometers (nm), which is the central wavelength for most widely used fluorescent markers in biology (i.e. green fluorescent protein (GFP) and its derivatives). For system NA=0, the oblique plane imaging setup fails, and hence system resolution numbers are not included in the table.

Having the knowledge of numerical aperture (first column of the table in FIG. 2) of an objective (or imaging system), Rayleigh criterion helps determine its resolution (second column of the table) by the following relationship:

$$\text{Resolution} = 0.61 \times \frac{\lambda}{NA} \quad \text{Eq. 1}$$

In Equation 1, '$\lambda$' refers to the wavelength of light used. The definition of numerical aperture (NA) helps in determining the maximum acceptance angle and hence the maximum tilt angle of the oblique plane illumination (third column of the table) by the following relation:

$$\varphi = \sin^{-1}\left(\frac{NA}{n}\right), \quad \text{Eq. 2}$$

In Equation 2, '$\varphi$' is the maximum tilt angle and 'n' is the refractive index of immersion media of the given objective (n=1.33 for the generalized case depicted in the table of FIG. 2). In alternative embodiments, a different refractive index of immersion media may be used. The effective NA of the oblique plane imaging system (fourth column of the table in FIG. 2) is determined by calculating the effective angle of overlap between acceptance angles of the second and third objectives, which is (3$\varphi$−90°). A negative value of this angle implies that there is no overlap and hence system NA is zero. For positive values, the system NA is given by sin(1.5$\varphi$−45°). Finally, the system resolution (fifth column of the table) is obtained by using the Rayleigh resolution relationship of Equation 1 with the determined system NA value.

It is evident from the table of FIG. 2 that conventional oblique plane imaging techniques work only for high NA objective choices. Even with a moderately high NA of 0.5, the system fails to image. The above considerations are general, and in practice it is possible to mix the choice of objectives such that the amount of overlap between the second and third objectives is optimized, even with one of them being a high NA objective. Still, the table illustrates the strong dependence of this class of imaging techniques on NA, and it is impossible to image with e.g., 0.3 NA or smaller objectives.

From the table of FIG. 2, it can be seen that NA=0.3 objectives are individually capable of ~1 micrometer (μm) resolution, but fail to resolve anything when used in a conventional oblique plane imaging setup. At the same time, it is noted that the loss in effective NA of an oblique plane imaging setup comes at the interface of the second and third objective. The novel solutions described herein use a low NA objective in oblique plane imaging to get rid of the interface where NA loss occurs. Specifically, in some embodiments, the third objective and related optics are removed, and are replaced by a small pixel image sensor positioned directly at the intermediate plane ahead of the second objective.

Figure 3:
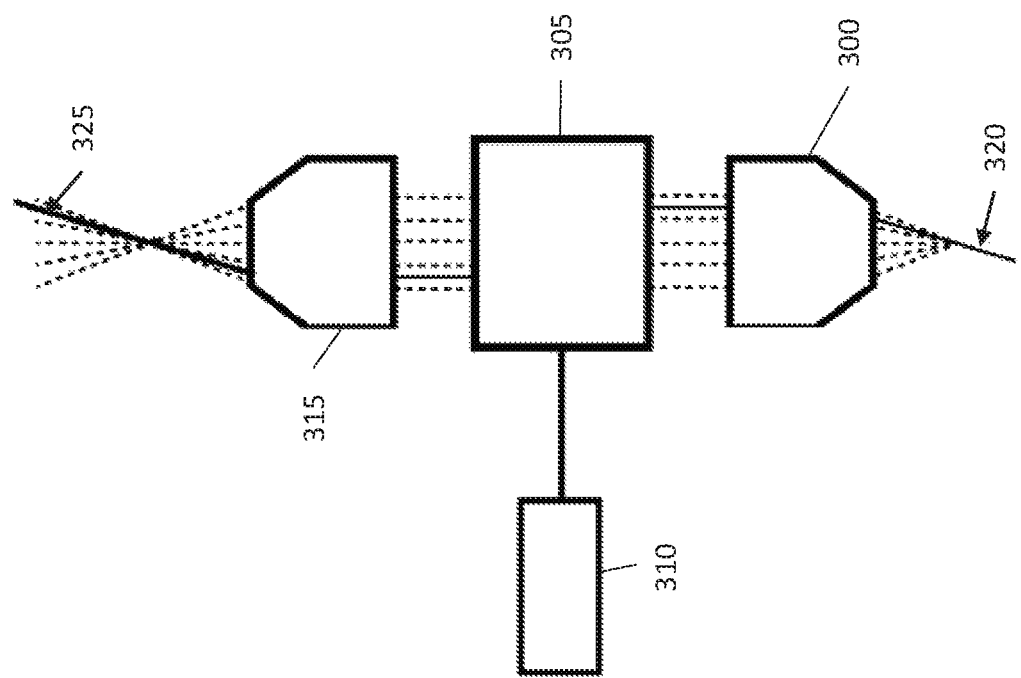
FIG. 3 depicts a low NA objective based oblique plane illumination imaging system in accordance with an illustrative embodiment.

FIG. 3 depicts a low NA objective based oblique plane illumination imaging system in accordance with an illustrative embodiment. As shown, the oblique plane imaging system includes a first microscope objective 300, an image relay and scan unit 305, an excitation unit 310, and a second microscope objective 315. Also depicted in FIG. 3 are an illumination plane 320 and an image plane 325. In the embodiment of FIG. 3, a small pixel image sensor is placed directly at the intermediate image plane 325 ahead of the second microscope objective 315. The image sensor can be a camera or other image capturing device. The embodiment of FIG. 3 allows most of the NA of the system to be retained. Theoretically, the system NA could be the same as that of individual objectives. However, in practice there is a small loss in NA due to the image sensor placement being at a smaller angle (with respect to the axis of the objective) than that dictated by the objective NA. This is done to avoid clipping of the finite aperture beam at the edge of the objective, and it leads to a slight reduction of acceptance angle as shown in FIG. 4.

Figure 4:
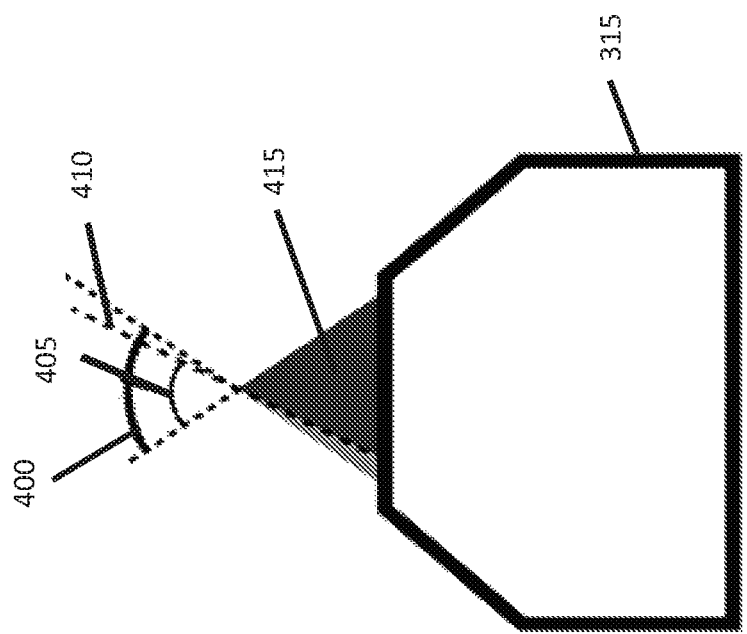
FIG. 4 depicts the effective NA of the system of FIG. 3 in accordance with an illustrative embodiment.

FIG. 4 depicts the effective NA of the system of FIG. 3 in accordance with an illustrative embodiment. The effective NA is due to direct placement of an image sensor on the intermediate image plane ahead of the second microscope objective 315. FIG. 4 shows an acceptance cone 400 of the second microscope objective 315, a net acceptance cone 405, and an image sensor plane 410. Also shown is the effective acceptance angle 415 (i.e., the darker shaded region).

In the embodiment depicted in FIGS. 3 and 4, the system NA (~0.3) leading to ~1 μm attainable resolution is no longer the limiting factor when imaging most biological samples at the cellular level. However, the system resolution is now limited by the image sensor pixel size. For this reason, small pixel image sensors (e.g., sensors finding wide applications in modern mobile phones) are both a low-cost and efficient choice for the proposed system. As an example, the Sony IMX219PQ sensor with 1.12 μm pixel size and easy availability is a good fit for the proposed system. In alternative embodiments, a different type and/or size image sensor may be used.

The effective pixel size in the sample plane depends on the magnification factor between the sample plane and the image sensor plane. For the case where both objectives are dry, this magnification factor is unity. For another case where the first objective is a water immersion type, followed by a dry second objective, the magnification factor is 1.33, thus further improving the attainable resolution due to the smaller effective pixel size (1.12/1.33=0.92 μm) in the sample plane. The magnification factor of 1.33 in the case of a water-dry objective combination arises due to the desire to maintain equal lateral and axial magnification of the system between sample and image planes, so that the images captured by sensors are undistorted, which streamlines the three-dimensional (3D) reconstruction of samples.

Described in detail below are four embodiments of oblique plane illumination imaging systems that utilize low NA objectives. Additional embodiments are also possible using the techniques and systems described herein. In a first embodiment, the system uses two finite conjugate objectives to form a static oblique illumination plane. In a second embodiment, the system includes two infinity corrected objectives, along with a matching tube-lens, for forming a static oblique illumination plane. In the first and second embodiments, a 3D image can be captured by mounting the sample on a translation stage that is able to reposition the sample during the imaging process. In a third embodiment, two infinity corrected objectives are used along with a matching tube-lens and a scan unit, which helps form a constant tilt scanned oblique plane illumination plane. As such, in the third embodiment, a 3D image can be captured without translating the sample. In a fourth embodiment, the system avoids use of a small pixel image sensor by incorporating a diffusive screen at the intermediate image plane. In this embodiment, the system re-images the screen projected image with a third objective and a tube lens assisted magnification unit, which forms the final image on a regular scientific image sensor.

The embodiments described herein include an imaging sub-system, an illumination sub-system, a scanning sub-system, and a 3D reconstruction sub-system/method. Among the sub-systems, the illumination sub-system is responsible for the creation of a planar illumination beam. The illumination sub-system can be implemented in a number of different ways, several of which are described below.

Figure 5:
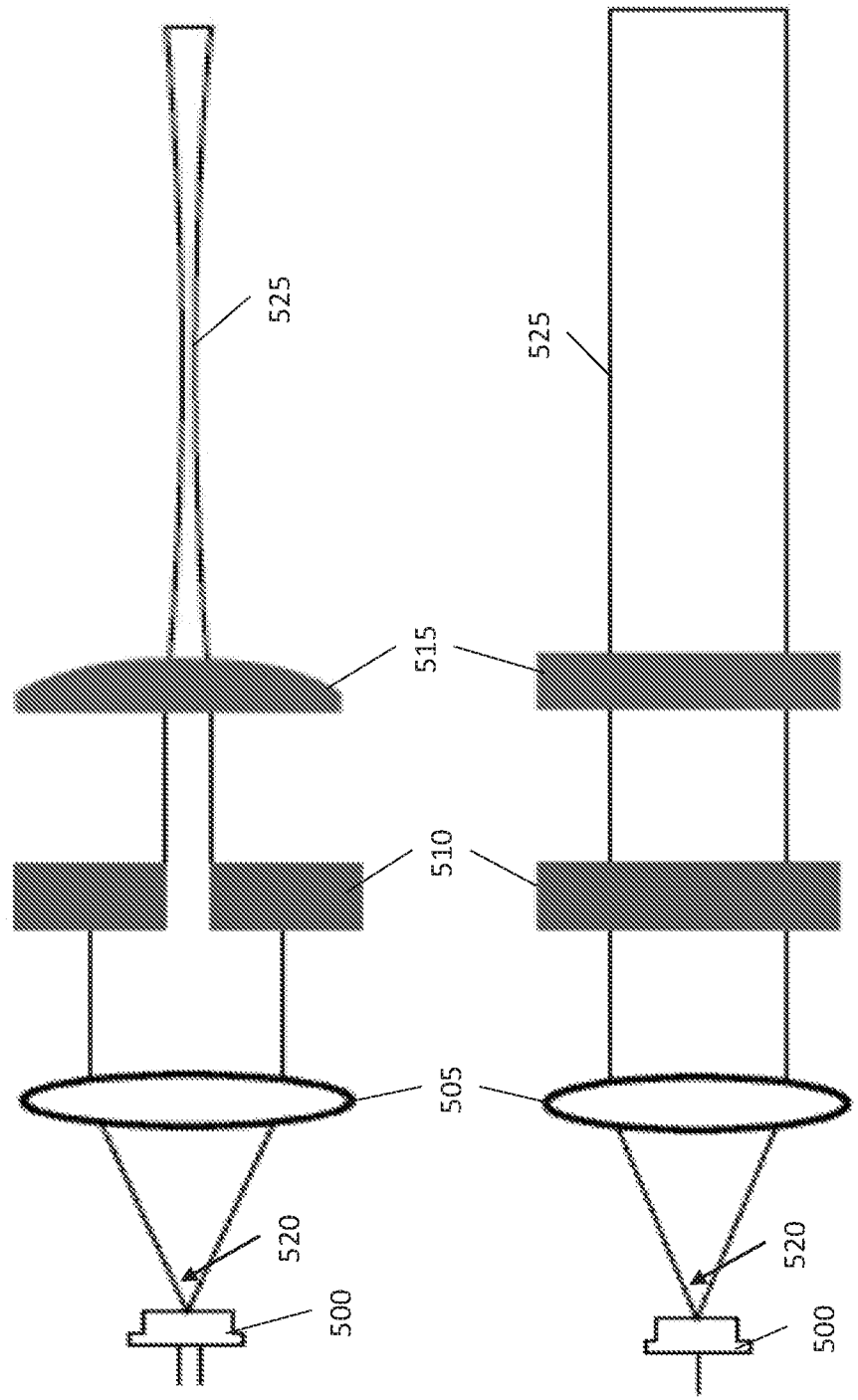
FIG. 5A depicts a top view of an illumination sub-system in accordance with an illustrative embodiment.
FIG. 5B depicts a side view of the illumination subsystem of FIG. 5A in accordance with an illustrative embodiment.

FIG. 5A depicts a top view of an illumination sub-system in accordance with an illustrative embodiment. FIG. 5B depicts a side view of the illumination sub-system of FIG. 5A in accordance with an illustrative embodiment. The embodiment of FIGS. 5A and 5B includes a laser diode 500, a collimating lens 505, s slit aperture 510, and a cylindrical lens 515. In alternative embodiments, the sub-system may include fewer, additional, and/or different components. In the embodiment of FIGS. 5A and 5B, a diverging beam 520 from the laser diode 500 is collimated using the collimating lens 505 and then passed through the slit aperture 510 and the cylindrical lens 515 to form a planar illumination beam 525.

Figure 6:
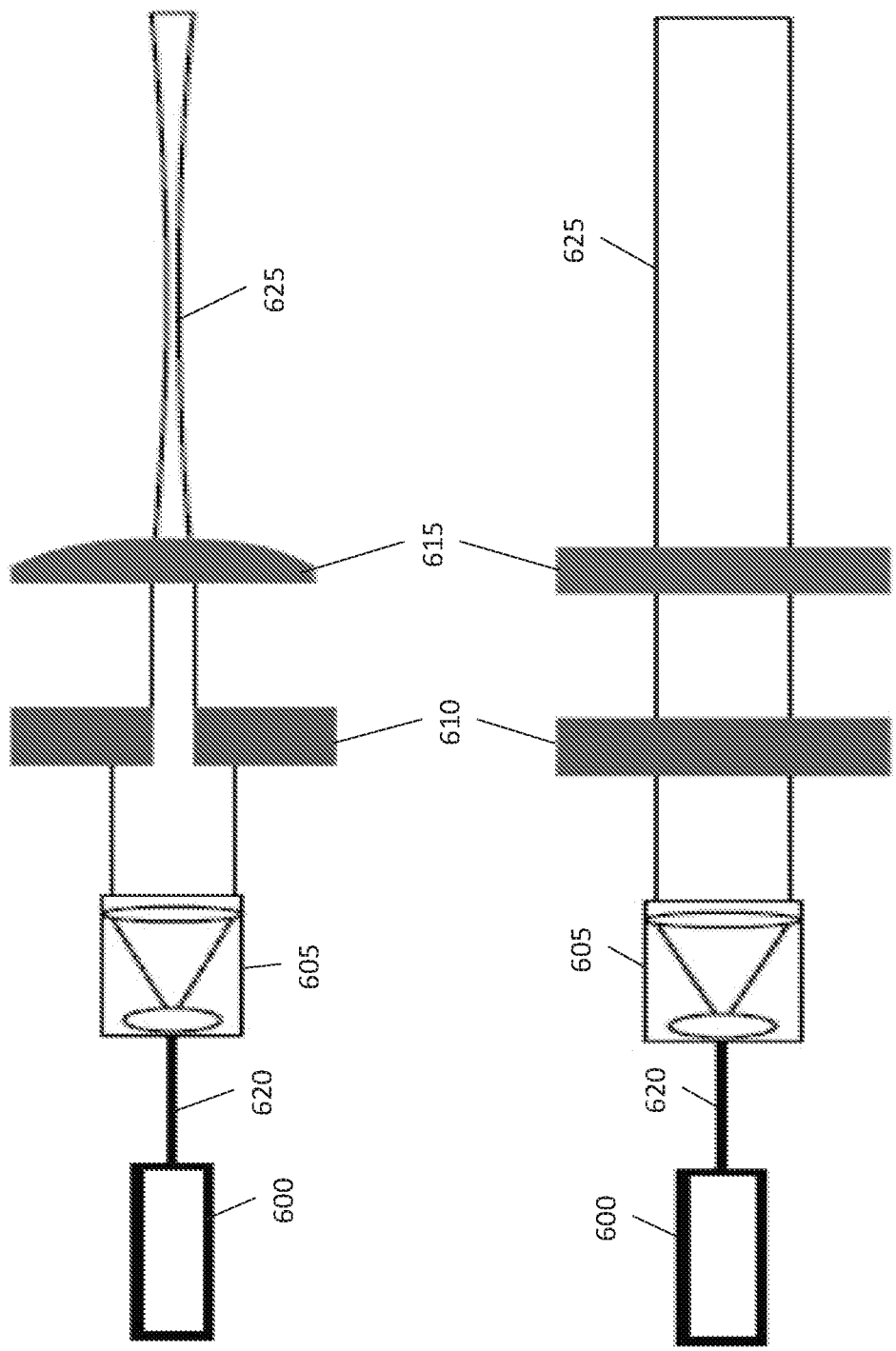
FIG. 6A depicts a top view of an illumination sub-system in accordance with an illustrative embodiment.
FIG. 6B depicts a side view of the illumination subsystem of FIG. 6A in accordance with an illustrative embodiment.

FIG. 6A depicts a top view of an alternative illumination sub-system in accordance with an illustrative embodiment. FIG. 6B depicts a side view of the illumination sub-system of FIG. 6A in accordance with an illustrative embodiment. The embodiment of FIGS. 6A and 6B includes a laser 600, a beam expander 605, a slit aperture 610, and a cylindrical lens 615. In alternative embodiments, the sub-system may include fewer, additional, and/or different components. In the embodiment of FIGS. 6A and 6B, a collimated laser beam 620 from the laser 600 is expanded by the beam expander 605, and passed through the slit aperture 610 and the cylindrical lens 615 to form a planar illumination beam 625.

Figure 7:
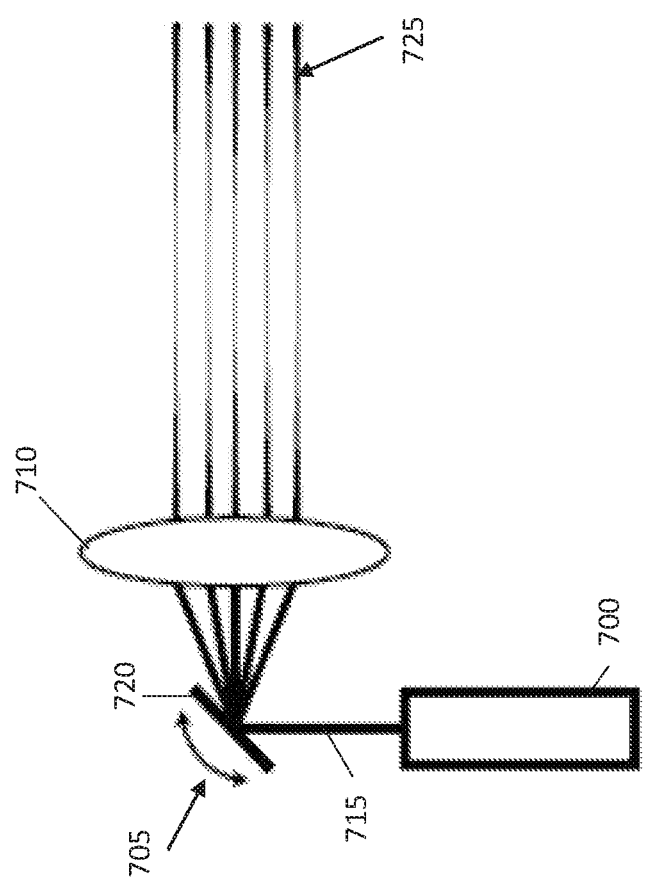
FIG. 7 depicts a side view of an illumination sub-system in accordance with an illustrative embodiment.

FIG. 7 depicts a side view of an illumination sub-system in accordance with another illustrative embodiment. The embodiment of FIG. 7 includes a laser 700, a galvo scanner (or galvanometer) 705, and a scan lens 710. In alternative embodiments, the sub-system of FIG. 7 may include fewer, additional, and/or different components. In the embodiment of FIG. 7, a laser beam 715 is scanned through a mounted planar mirror 720 of the galvanometer 705, and then focused through the scan lens 710 to form a planar illumination beam 725.

In an illustrative embodiment, the choice of source wavelength in the illumination sub-system (i.e., any of the sub-systems depicted in FIGS. 5-7) is based on the fluorescent protein or dye of interest. Also, in some embodiments, multiple illumination sources may be used to allow for multi-color imaging. In such an embodiment, different types of illumination sources may be used.

In another illustrative embodiment, the 3D reconstruction sub-system/method described herein can be common among all of the described embodiments. The 3D dataset is acquired by a tilted planar illumination, and therefore deviates from a conventional dataset acquired in Cartesian coordinates. As a result, the 3D dataset is geometrically skewed and a 3D Affine transformation is utilized to correct the orientation. The Affine transformation can be a combination of two geometrical transforms: scale and shear, and is given by the following matrix:

$$M_{sh} \times M_{sc} = \begin{bmatrix} 1 & 0 & 0 & 0 \\ 0 & 1 & 0 & 0 \\ 0 & -\tan\theta & 1 & 0 \\ 0 & 0 & 0 & 1 \end{bmatrix} \times \begin{bmatrix} 1 & 0 & 0 & 0 \\ 0 & \cos\theta & 0 & 0 \\ 0 & 0 & 1 & 0 \\ 0 & 0 & 0 & 1 \end{bmatrix} = \begin{bmatrix} 1 & 0 & 0 & 0 \\ 0 & \cos\theta & 0 & 0 \\ 0 & -\sin\theta & 1 & 0 \\ 0 & 0 & 0 & 1 \end{bmatrix} \quad \text{Eq. 3}$$

In the matrix of Eq. 3, 'θ' is the tilt angle the planar illumination beam makes with the principal axis of the first objective. The matrix can be solved by a computing sub-system that is incorporated into the imaging system or remote from the imaging system, depending on the implementation. A computing sub-system is described in more detail below with reference to FIG. 12.

Figure 8:
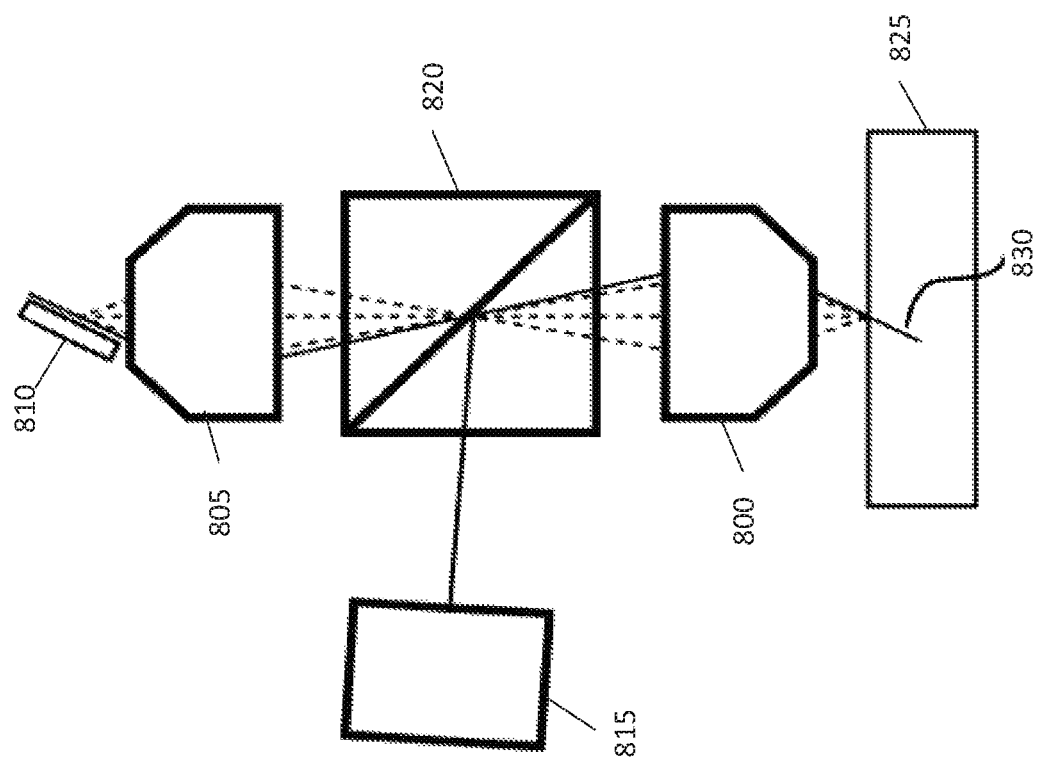
FIG. 8 depicts a low NA lens based oblique plane illumination imaging system in accordance with a first illustrative embodiment.

The description now turns to a detailed discussion of the various different embodiments referenced above. FIG. 8 depicts a low NA lens based oblique plane illumination imaging system in accordance with the first illustrative embodiment. The first embodiment can be implemented as a compact setup which provides a static oblique plane illumination inside a given sample. The system of FIG. 8 includes an imaging sub-system that includes a first low NA finite conjugate objective 800, a second low NA finite conjugate objective 805, and a small pixel camera sensor 810. As used herein, low NA can refer to an NA that is smaller than 0.5. In alternative implementations, low NA can refer to another value, such as smaller than 0.3, smaller than 0.4, smaller than 0.6, etc. As used herein, 'small pixel' can refer to a pixel value of smaller than 5 µm. In alternative implementations, small pixel can refer to another value, such as smaller than 3 µm, smaller than 4 µm, smaller than 6 µm, etc.

The system of FIG. 8 also includes an illumination sub-system that includes an excitation unit 815 and a beam splitter 820. The excitation unit 815 can include a fluorescence excitation source in the form of a laser or laser diode. The excitation unit 815 can also include a beam expander, slit aperture, and cylindrical lens, such as that depicted in FIGS. 6A and 6B. Alternatively, instead of the beam expander, slit aperture, and cylindrical lens, the excitation unit 815 may include a galvo scanner and converging lens such as the embodiment depicted in FIG. 7. The beam splitter 820 is used to combine or direct the excitation beam into the first low NA finite conjugate objective 800 to enable the oblique plane imaging.

The system of FIG. 8 also includes a 3D scanning sub-system 825 that can include a sample holder and a translation stage. The translation stage is used to move along the X-Y plane to sweep across a large sample. As depicted, an illumination plane 830 is directed onto the 3D scanning sub-system 825. In the embodiment of FIG. 8, 3D reconstruction can be performed by a stitching algorithm which is used to stitch large 3D scan tiles, in conjunction with an Affine transformation which is used to obtain the correct geometrical orientation of the sample. The 3D reconstruction can be performed by a local or remote computing sub-system that is in direct or indirect communication with the system. In alternative embodiments, the system of FIG. 8 may include fewer, additional, and/or different components.

In the embodiment of FIG. 8, the imaging sub-system is responsible for forming the image of the oblique illumination plane on the small pixel camera sensor 810. As discussed above, the imaging sub-system includes the first and second low NA finite conjugate objectives (800, 805) and the small pixel camera sensor 810. The first and second low NA finite conjugate objectives (800, 805) are arranged facing away from each other in such a way that they have a common conjugate image plane. The small pixel image sensor 810 is kept in proximity to the low NA finite conjugate objective 805 at the distal end in an oblique orientation which precisely matches the tilt of the oblique illumination plane. The tilts are matched because the net magnification of this imaging system, which is equal to unity, is the same along the lateral direction and the axial direction.

The oblique plane illumination sub-system 815 has been described above in detail. The generated planar illumination beam is positioned at the conjugate image plane of the (front facing) low NA finite conjugate objective 800 with an off-axis tilt. The beam splitter 820 helps direct the light-sheet at an off-axis angle into the objective 800 to form an oblique illumination plane in a sample volume. This illuminated plane is imaged by the symmetrical unity magnification optical system (i.e., imaging sub-system) at the distal end of the system. The small pixel (and form factor) image sensor 810 can be placed matching the image plane at the distal end of the system to image the illuminated plane as shown in the FIG. 8.

In the embodiment of FIG. 8, if a fluorescently tagged biological sample is to be imaged, then the choice of excitation source wavelength and dichroic beam splitter allows for imaging of fluorescent protein, dye, or other sample. This arrangement provides a static planar illumination and hence images a 2D section inside a given sample. An image sensor can rely on either a global shutter mechanism or a rolling shutter mechanism without a need for the sensor to be physically shifted. For 3D imaging, the sample can be mounted on an automated translation stage and synchronized imaging which registers the sample/stage position can be performed. Such position-tagged images can then be stitched together to form big volume datasets. Because of the oblique nature of the illumination, the reconstructed volume is skewed. However, a true orientation reconstruction can be obtained by a simple 3D Affine transformation operation as described above.

Figure 9:
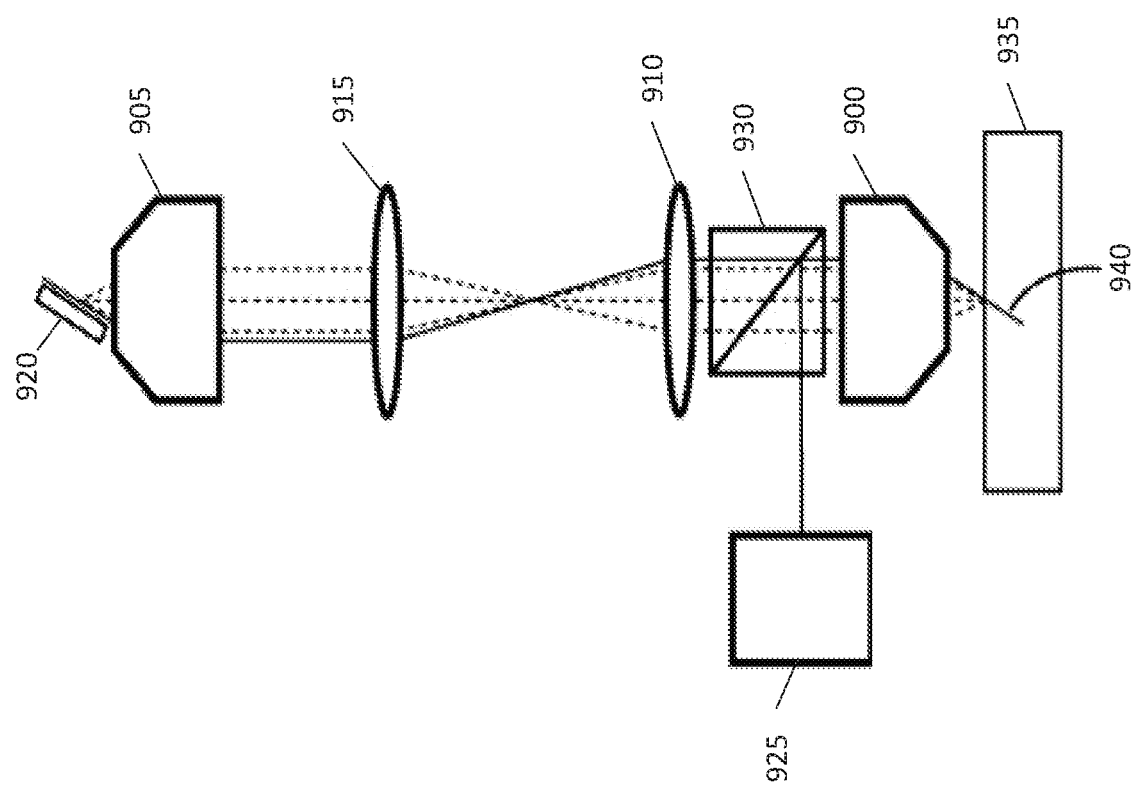
FIG. 9 depicts a low NA lens based oblique plane illumination imaging system in accordance with a second illustrative embodiment.

FIG. 9 depicts a low NA lens based oblique plane illumination imaging system in accordance with the second illustrative embodiment. The system of FIG. 9 has an imaging sub-system that includes a first low NA infinite conjugate (or infinity corrected) objective 900, a second low NA infinite conjugate (or infinity corrected) objective 905, a first tube lens 910, a second tube lens 915, and a small pixel camera sensor 920. The system also includes an illumination sub-system that includes an excitation unit 925 and a beam splitter 930. The excitation unit 925 includes a fluorescence excitation source, which can be in the form of a laser or laser diode. The excitation unit 925 also includes a beam expander, slit aperture, and cylindrical lens (e.g., as shown in FIGS. 6A and 6B), or alternatively a galvo scanner and converging lens (e.g., as shown in FIG. 7). The beam splitter 930 is used to combine or direct the excitation beam from the excitation unit 925 onto the first low NA infinite conjugate objective 900 to facilitate the oblique plane imaging.

The system of FIG. 9 also includes a 3D scanning sub-system 935 that can include a sample holder and a translation stage. The translation stage is used to move along the X-Y plane to sweep across a large sample. As depicted, an illumination plane 940 is directed onto the 3D scanning sub-system 935. In alternative embodiments, the system of FIG. 9 may include fewer, additional, and/or different components.

In the embodiment of FIG. 9, the imaging sub-system is responsible for forming the image of the oblique illumination plane onto the small pixel camera sensor 920. As discussed, the imaging sub-system includes the first and second low NA infinity conjugate objectives (900, 905), the first and second tube lenses (910, 915), and the small pixel camera sensor 920. The objective-tube lens pairs are arranged facing away from each other in such a way that they have a common conjugate image plane. The small pixel image sensor 920 is kept in proximity to the second low NA infinity conjugate objective at the distal end of the system in an oblique orientation which gets precisely matched with the tilt of the oblique illumination plane. The tilts are matched because the net magnification of this imaging system is the same along the lateral and axial direction (equal to unity) when both objectives are dry.

For some samples, at least one of the objectives in FIG. 9 can be a water immersion objective. In such a case, the magnification is maintained to be a ratio of indices of water and air, (i.e., 1.33). The generated planar illumination beam is positioned either at the conjugate image plane of the front facing first low NA infinity corrected objective 900 with an off-axis tilt (i.e., similar to the first embodiment) or parallel to the principal axis with an offset at back focal plane of the objective 900 (i.e., as shown in FIG. 9). The beam splitter 930 helps direct the beam to form an oblique illumination plane in the sample volume. This illuminated plane gets imaged at the distal end of the system. The small pixel (and form factor) image sensor 920 is placed matching the image plane at the distal end of the system to image the illuminated plane, as shown in the FIG. 9. This arrangement provides a static planar illumination and hence images a 2D section inside a given sample. The effective pixel size in the system is given by camera pixel size/magnification=camera pixel size/1.33 (or camera pixel size for all dry objectives). For 3D imaging, the sample can be mounted on an automated translation stage and a synchronized imaging followed by stitching and 3D Affine transformation can be used to obtain a true orientation reconstruction as described herein.

Figure 10:
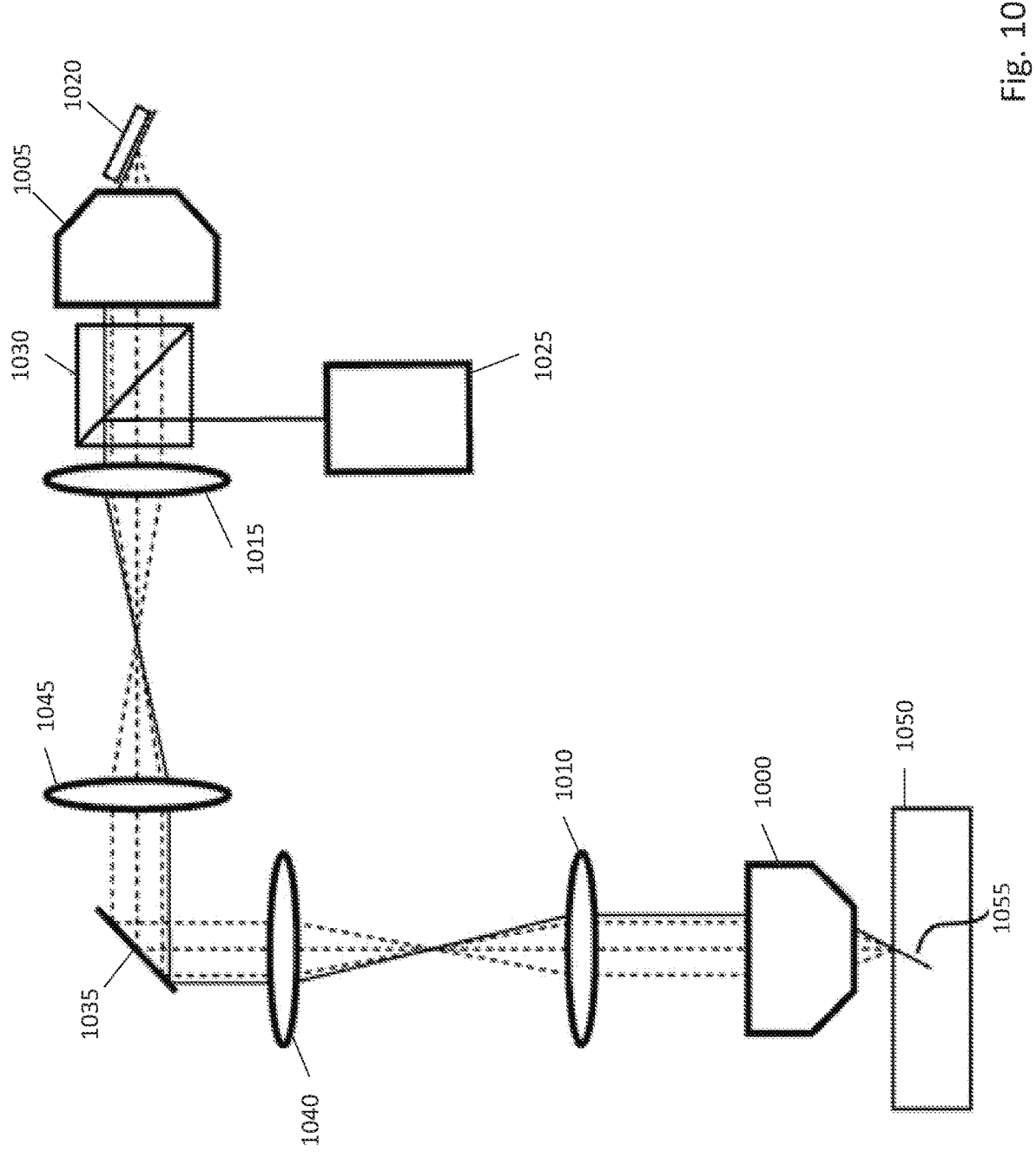
FIG. 10 depicts a low NA lens based oblique plane illumination imaging system in accordance with a third illustrative embodiment.

FIG. 10 depicts a low NA lens based oblique plane illumination imaging system in accordance with the third illustrative embodiment. As discussed in more detail below, the system of FIG. 10 differs from the embodiments of FIGS. 8 and 9 in part because it includes a scan unit for 3D microscopy that enables remote, tilt-invariant scanning of the oblique plane illumination. The system of FIG. 10 also includes an imaging sub-system that includes a first low NA infinite conjugate objective 1000, a second low NA infinite conjugate objective 1005, a first tube lens 1010, a second tube lens 1015, and a small pixel camera sensor 1020.

The illumination sub-system of the embodiment of FIG. 10 includes an excitation unit 1025 and a beam splitter 1030. The excitation unit 1025 includes a fluorescence excitation source (e.g., laser or laser diode). The excitation unit 1025 also includes a beam expander, slit aperture, and cylindrical lens (e.g., as shown in FIGS. 6A and 6B), or alternatively a galvo scanner and converging lens (e.g., as shown in FIG. 7). The beam splitter 1030 is used to combine or direct the excitation beam onto the first low NA infinite conjugate objective 1000 to facilitate the oblique plane imaging.

The system of FIG. 10 also includes a 3D scanning sub-system that has a galvanometer mounted planar scan mirror 1035, a first converging lens 1040, and a second converging lens 1045. A computing sub-system associated with the system includes a graphical user interface and software that allows a user to control the galvanometer mounted planar scan mirror 1035. The 3D scanning sub-system also includes a translation stage 1050 to provide coarse placement of the sample. An illumination plane 1055 to be imaged is also shown. Similar to the other embodiments, 3D reconstruction can be performed by a stitching algorithm which is used to stitch large 3D scan tiles, in conjunction with an Affine transformation which is used to obtain the correct geometrical orientation of the sample. The 3D reconstruction can be performed by a local or remote computing sub-system that is in direct or indirect communication with the system. In one embodiment, the same computing sub-system used to control the galvanometer mounted planar scan mirror 1035 can be used to perform the 3D reconstruction. In alternative embodiments, the system of FIG. 10 may include fewer, additional, and/or different components.

As shown in FIG. 10, the 3D scanning sub-system (i.e., the galvanometer mounted planar scan mirror 1035, first converging lens 1040, and second converging lens 1045) is arranged such that the galvo rotation axis is at a back focal plane of both of the lenses. Further, the conjugate image planes of both objective tube-lens pairs is matched with a front focal plane of the two converging lenses surrounding the galvanometer mounted planar scan mirror 1035. This arrangement ensures that rotation of the galvo scanner leads to a tilt-invariant scanning of the oblique illumination plane in the sample volume. This arrangement further enables a sample to be imaged without any physical movement of the translation stage 1050 or objectives. The 3D re-construction of an imaged volume is similar to the previously described embodiments. However, this embodiment also allows for acquisition of multiple 3D tiles via a combination of galvo scanner sweep and manual coarse movement of the translation stage 1050 that includes the sample being imaged. Such tiles could be stitched together and 3D Affine transformed to obtain a true perspective large-scale 3D reconstruction of the sample. This approach eliminates mechanical vibration associated with any translation stage as all the tiles are essentially acquired through remote scanning of the oblique plane illumination beam.

Figure 11:
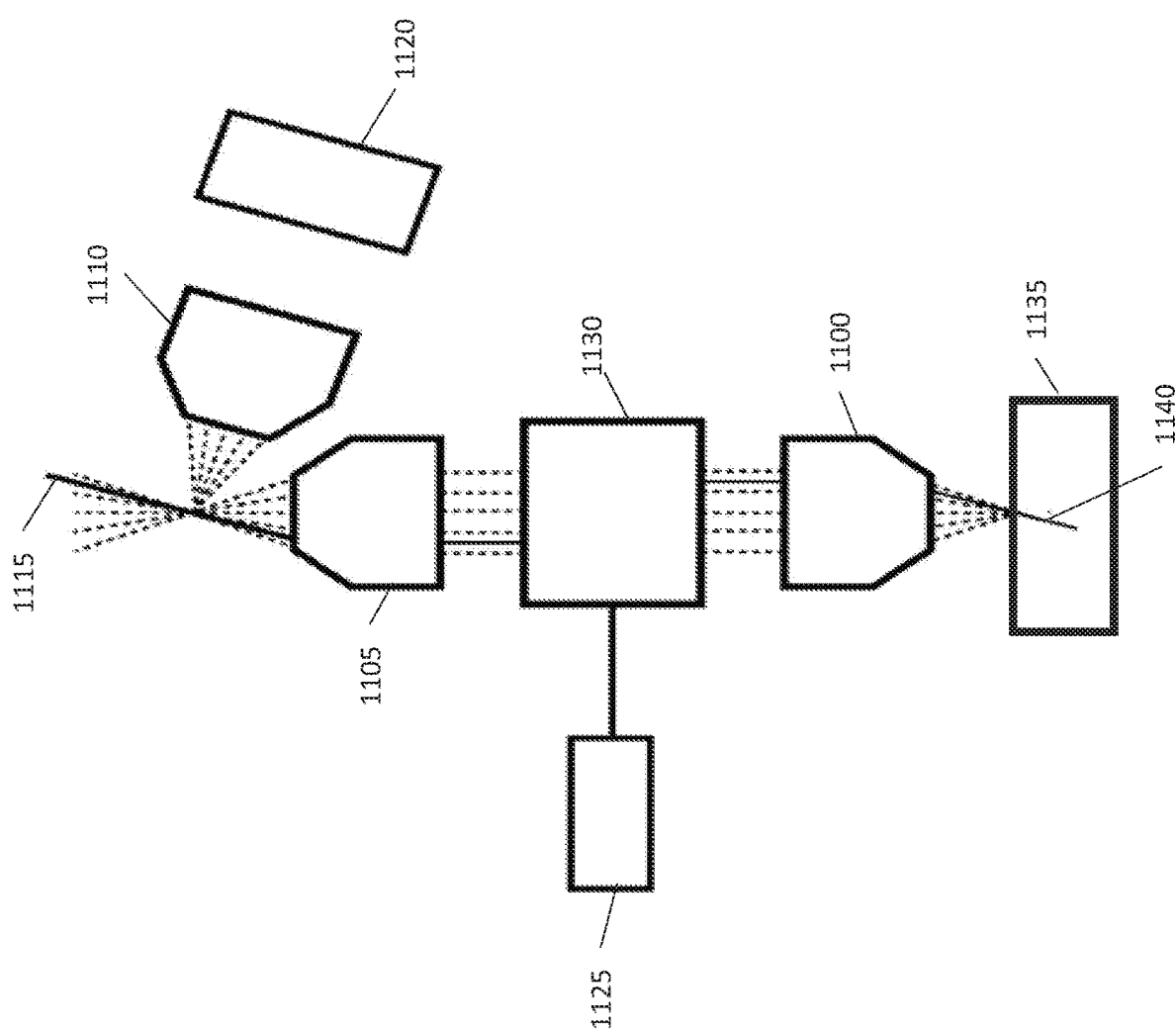
FIG. 11 depicts a low NA lens based oblique plane illumination imaging system in accordance with a fourth illustrative embodiment.

FIG. 11 depicts a low NA lens based oblique plane illumination imaging system in accordance with the fourth illustrative embodiment. An imaging sub-system of the system includes a first low NA objective (and associated tube lens) 1100, a second low NA objective (and associated tube lens) 1105, a third low NA objective (and associated tube lens) 1110, a diffusive screen 1115 for intermediate image projection, and a standard camera sensor 1120. The standard camera sensor 1120 can be of any pixel size, form factor, etc.

An illumination sub-system of the fourth embodiment includes an excitation unit 1125. The excitation unit 1125 can be a fluorescence excitation source such as a laser diode or laser. The illumination sub-system can also include a beam expander, slit aperture, and cylindrical lens (e.g., as shown in FIGS. 6A and 6B), or alternatively a galvo scanner and converging lens (e.g., as shown in FIG. 7). In some embodiments, the illumination sub-system can also include a beam splitter to combine or direct the excitation beam onto the first low NA objective 1100 to facilitate the oblique plane imaging.

A 3D scanning sub-system of the fourth embodiment includes an image relay and scan unit 1130. The image relay and scan unit 1130 can include a galvanometer mounted planar scan mirror along with two converging lenses. A computing sub-system associated with the system can include a graphical user interface and software that allows a user to control the galvanometer mounted planar scan mirror of the image relay and scan unit 1130. The 3D scanning sub-system also includes a translation stage 1135 to provide coarse placement of the sample being imaged. An illumination plane 1140 to be imaged is also shown. Similar to the other embodiments, 3D reconstruction can be performed by a stitching algorithm which is used to stitch large 3D scan tiles, in conjunction with an Affine transformation which is used to obtain the correct geometrical orientation of the sample. The 3D reconstruction can be performed by a local or remote computing sub-system that is in direct or indirect communication with the system. In one embodiment, the same computing sub-system used to control the galvanometer mounted planar scan mirror can be used to perform the 3D reconstruction. In alternative embodiments, the system of FIG. 11 may include fewer, additional, and/or different components.

In the first three embodiments herein, it is important to position the image sensor close to the objective at the distal end. This places two restrictions on the image sensor: 1) the form factor of the sensor has to be small and 2) the pixel size of the sensor has to be small (i.e., even for 0.3 NA objectives, the pixel size of image sensor becomes the resolution limiting factor). Most scientific image sensors do not meet these restrictions, and hence it is desirable to relax these restrictions on image sensor choice. The fourth embodiment described with reference to FIG. 11 does this by use of a very fine grain diffusing screen placed on the intermediate image plane, which used to be image sensor in earlier embodiments. The diffusing screen functions like a projection screen and allows for placement of a third sub-system in the form of the third low NA objective 1110, associated tube lens, and the standard camera sensor 1120 to form a magnified image of the projected scene. As such, all three of the microscope objectives can be low NA lenses that are still able to image an oblique illumination plane.

The use of a diffusive screen followed by a magnification system with a standard camera sensor can similarly be applied to any of the other embodiments described herein. Moreover, the imaging quality with this and earlier embodiments can be further improved by adding in-plane motion to the diffusive screen through a vibrator or motor. The in-plane motion of the diffusive screen averages out any surface irregularities of the diffuser.

Figure 12:
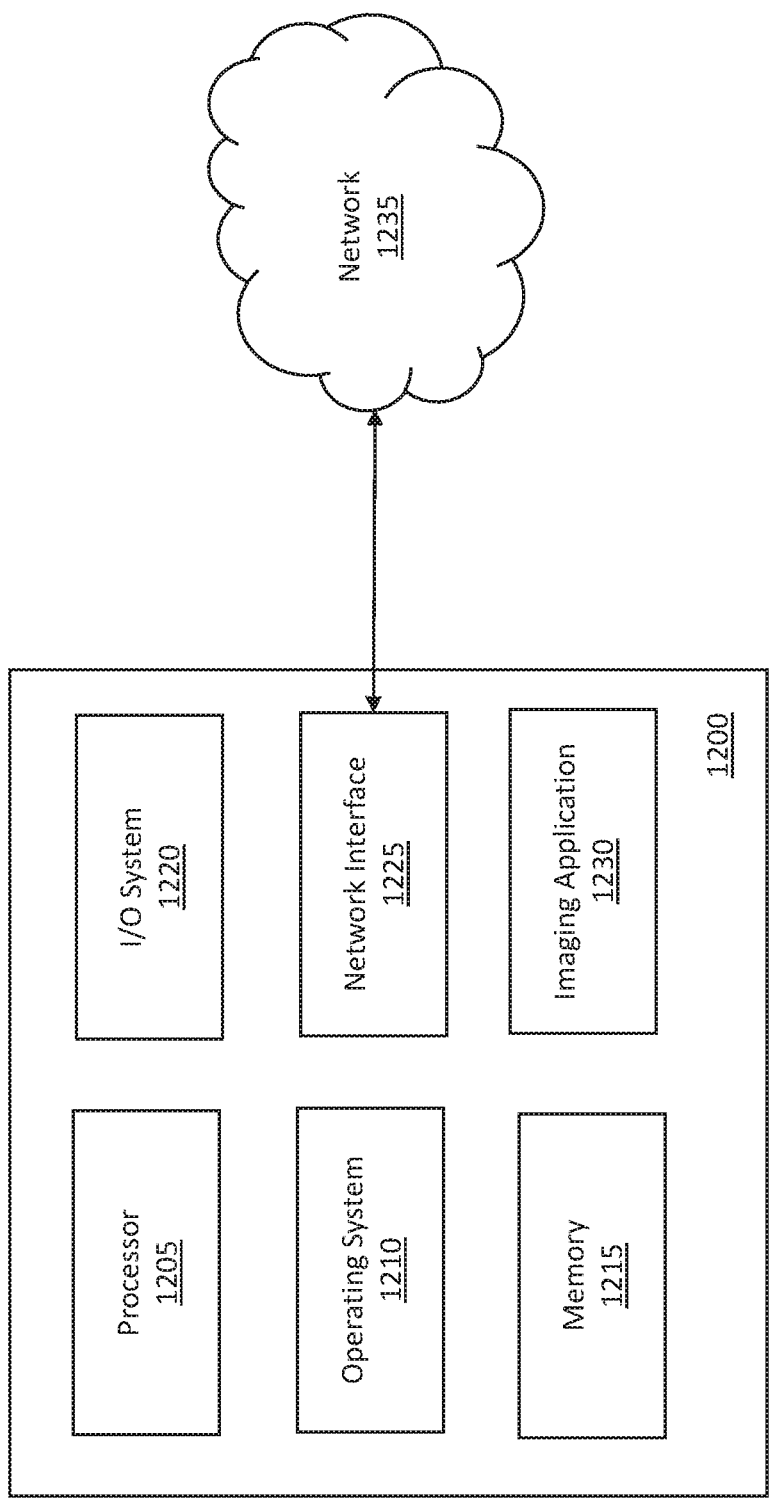
FIG. 12 is a block diagram of a computing device in communication with a network in accordance with an illustrative embodiment.

FIG. 12 is a block diagram of a computing device 1200 in communication with a network 1235 in accordance with an illustrative embodiment. The computing device 1200 can be a computing sub-system that is incorporated into or in communication with any of the imaging systems described herein. The computing device 1200 includes a processor 1205, an operating system 1210, a memory 1215, an input/output (I/O) system 1220, a network interface 1225, and an imaging application 1230. In alternative embodiments, the computing device 1200 may include fewer, additional, and/or different components. The components of the computing device 1200 communicate with one another via one or more buses or any other interconnect system. The computing device 1200 can be any type of networked computing device such as a laptop computer, desktop computer, smart phone, dedicating imaging computing sub-system, etc.

The processor 1205 can be any type of computer processor known in the art, and can include a plurality of processors and/or a plurality of processing cores. The processor 1205 can include a controller, a microcontroller, an audio processor, a graphics processing unit, a hardware accelerator, a digital signal processor, etc. Additionally, the processor 1205 may be implemented as a complex instruction set computer processor, a reduced instruction set computer processor, an x86 instruction set computer processor, etc. The processor is used to run the operating system 1210, which can be any type of operating system.

The operating system 1210 is stored in the memory 1215, which is also used to store programs, algorithms, network and communications data, peripheral component data, the imaging application 1230, and other operating instructions. The memory 1215 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc.

The I/O system 1220 is the framework which enables users and peripheral devices to interact with the computing device 1200. The I/O system 1220 can include a mouse, a keyboard, one or more displays, a speaker, a microphone, etc. that allow the user to interact with and control the computing device 1200. The I/O system 1220 also includes circuitry and a bus structure to interface with peripheral computing devices such as power sources, USB devices, peripheral component interconnect express (PCIe) devices, serial advanced technology attachment (SATA) devices, high definition multimedia interface (HDMI) devices, proprietary connection devices, etc. In an illustrative embodiment, the I/O system 1220 presents an interface to the user such that the user is able to control the galvo scanner in any of the imaging systems described herein.

The network interface 1225 includes transceiver circuitry that allows the computing device to transmit and receive data to/from other devices such as remote computing systems, servers, websites, etc. The network interface 1225 also enables communication through the network 1235, which can be one or more communication networks. The network 1235 can include a cable network, a fiber network, a cellular network, a wi-fi network, a landline telephone network, a microwave network, a satellite network, etc. The network interface 1225 also includes circuitry to allow device-to-device communication such as Bluetooth® communication.

The imaging application 1230 can include software in the form of computer-readable instructions which, upon execution by the processor 1205, performs any of the various operations described herein such as receiving data, running algorithms, solving equations/matrices, performing 3D reconstruction, etc. The imaging application 1230 can utilize the processor 1205 and/or the memory 1215 as discussed above. In an alternative implementation, the imaging application 1230 can be remote or independent from the computing device 1200, but in communication therewith.

Figure 13:
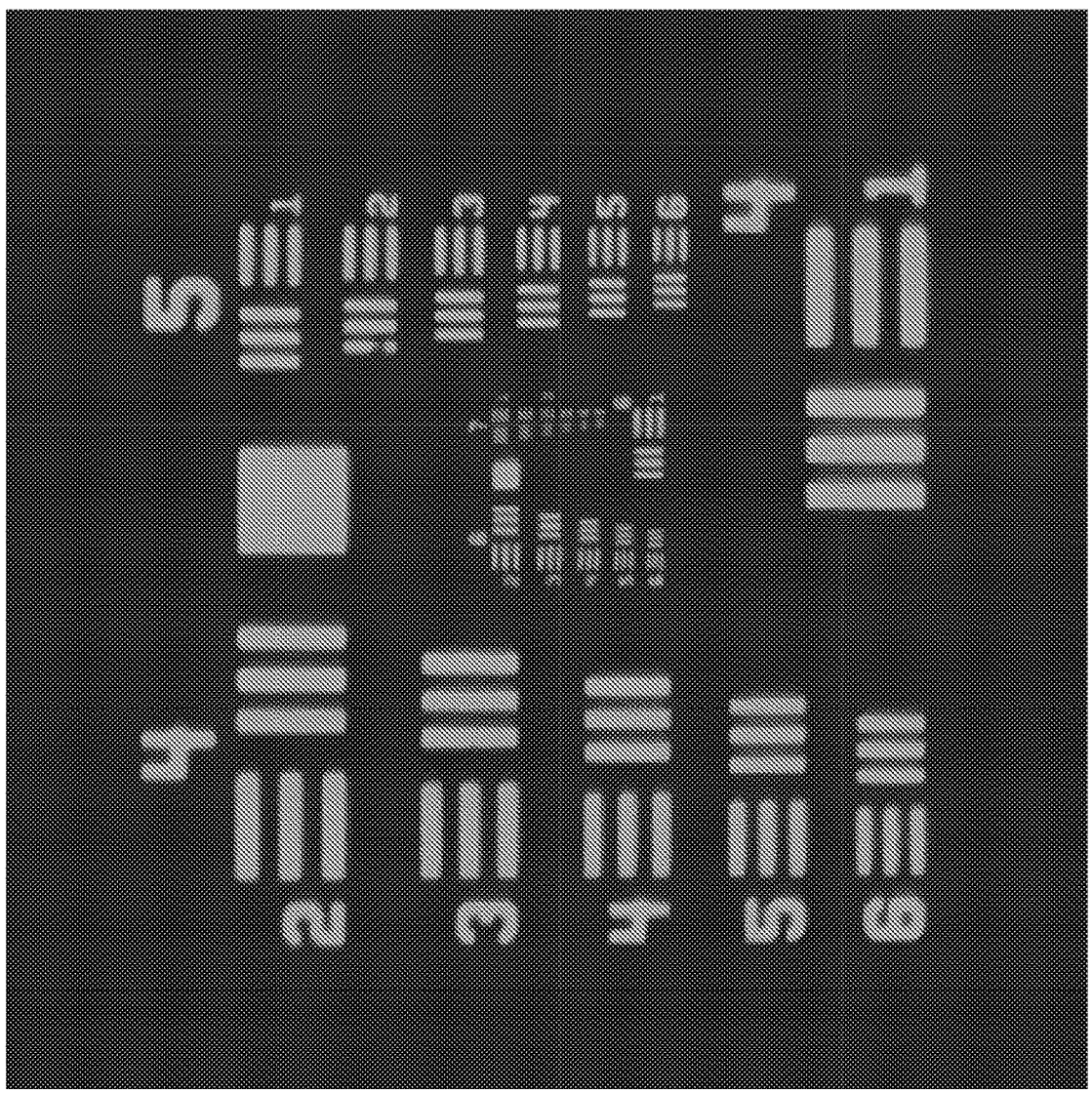
FIG. 13 depicts a United States Air Force (USAF) resolution test target imaged in brightfield illumination using the oblique plane illumination imaging system of FIG. 8 in accordance with an illustrative embodiment.

FIG. 13 depicts a United States Air Force (USAF) resolution test target imaged in brightfield illumination using the oblique plane illumination imaging system of FIG. 8 in accordance with an illustrative embodiment. To perform the imaging, a low numerical aperture (NA 0.1) was used along with low magnification (4×) objectives. Two Nikon 4×, 0.1 NA objectives were used for the first low NA finite conjugate objective 800 and the second low NA finite conjugate objective 805 depicted in FIG. 8. The USAF 1951 resolution test target was used as the sample for resolution estimates. A small pixel camera sensor was used as the small pixel camera sensor 810 of FIG. 8. The USAF target was back illuminated with a broadband white light source and imaged on the camera sensor. In alternative embodiments, different components may be used. The figure shows Group 6, element 6 lines to be clearly resolved, which indicates better than 5 µm resolution. Further enhancement in resolution can be obtained by imaging with a combination of smaller pixel camera sensor and higher NA microscope objectives.

Figure 14:
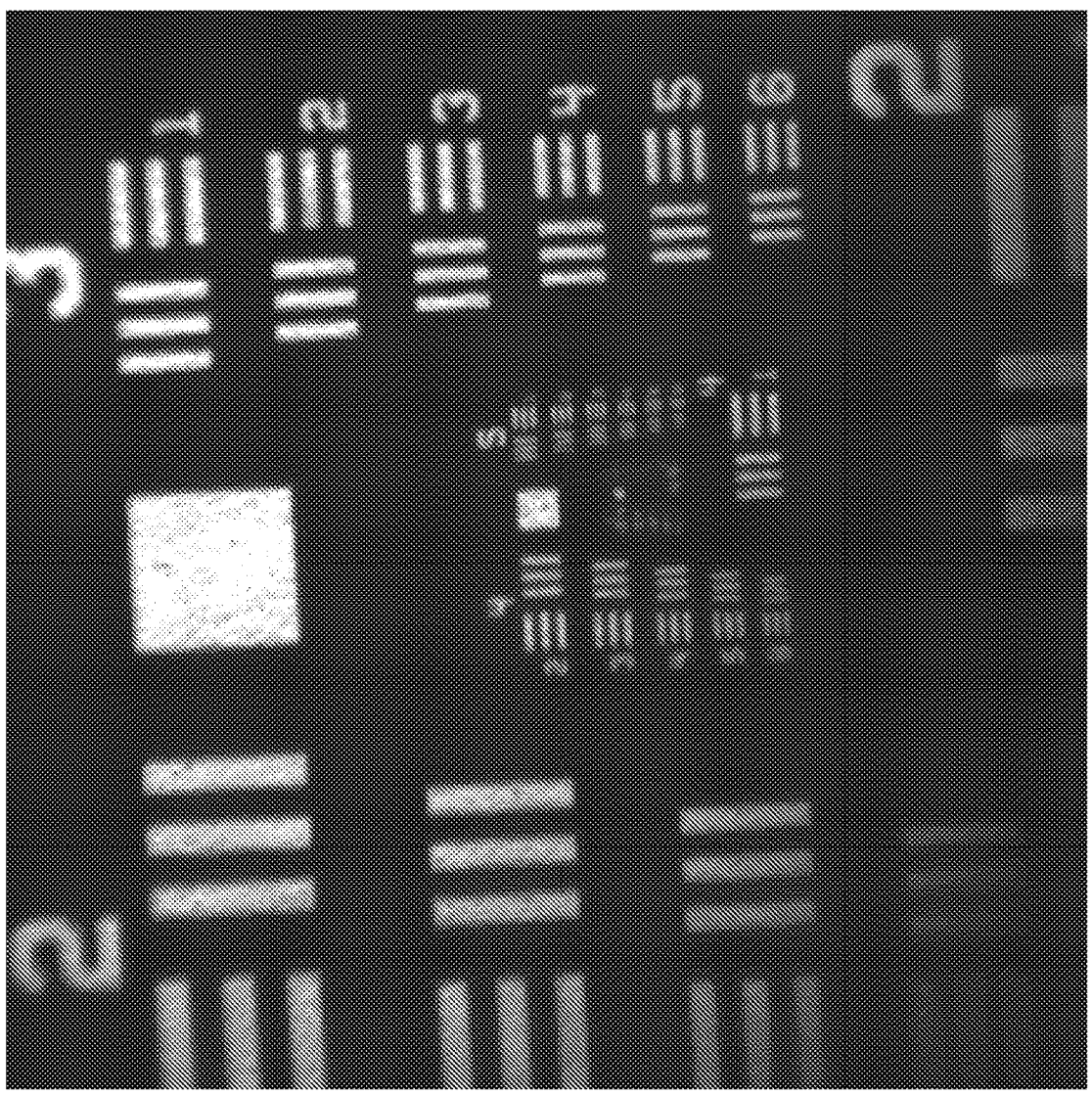
FIG. 14 depicts a USAF resolution test target imaged in brightfield illumination using the oblique plane illumination imaging system of FIG. 11 in accordance with an illustrative embodiment.

FIG. 14 depicts a USAF resolution test target imaged in brightfield illumination using the oblique plane illumination imaging system of FIG. 11 in accordance with an illustrative embodiment. To perform the imaging, a low numerical aperture (NA 0.1) was used along with low magnification (4×) objectives. Three Nikon 4×, 0.1 NA objectives were used as the first low NA objective 1100, the second low NA objective 1105, and the third low NA objective 1110 depicted in FIG. 11. The USAF 1951 resolution test target was again used as the sample for resolution estimates. A fine diffuser, made of opaque white glass was used as the diffusive screen 1115 of FIG. 11. The USAF target was back illuminated with a broadband white light source and imaged with a relay lens and camera sensor. In alternative embodiments, different components may be used. This imaging was performed with a static diffuser, resulting in minor speckling irregularities in the image. However, the figure shows Group 5, element 5 lines to be clearly resolved, indicating better than 10 µm resolution. Greatly enhanced resolution can be acquired by imaging with in-plane motion of the diffuser screen.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An imaging system comprising:
   a first finite conjugate objective at a frontal end of the system;
   a second finite conjugate objective at a distal end of the system;
   a beam splitting or merging element positioned between the first finite conjugate objective and the second finite conjugate objective;
   an excitation unit configured to direct an excitation beam into a sample positioned in front of the first finite conjugate objective, wherein the excitation beam is in the form of an excitation plane; and
   an image sensor positioned facing the second finite conjugate objective, wherein the image sensor lies in a conjugate plane of an excitation beam illumination plane at the frontal end of the system.

2. The system of claim 1, wherein the first finite conjugate objective and the second finite conjugate objective have a numerical aperture of 0.5 or less.

3. The system of claim 1, wherein the beam splitting or merging element comprises a cube beam splitter or a plate beam splitter with excitation and emission filters.

4. The system of claim 1, wherein the beam splitting or merging element comprises a dichroic beam splitter which allows only a fluorescence emission beam to pass through to the distal end of the system.

5. The system of claim 1, wherein the excitation unit includes any combination of a laser or laser diode, a beam expander, a slit aperture, and a cylindrical lens to shape the excitation beam into a planar excitation beam.

6. The system of claim 1, wherein the excitation unit includes any combination of a laser, a galvanometer mounted planar-mirror based scanner, and a converging lens to form a planar excitation beam, and wherein the excitation unit emits the excitation beam at an inclined angle such that resultant illumination is an oblique plane, tilted with respect to a principal axis of the first finite conjugate objective.

7. The system of claim 1, wherein a tilt angle of the excitation beam and the image sensor are matched such that the image sensor is able to image an entire illuminated plane at the same time.

8. The system of claim 1, further comprising a translation stage to hold the sample, wherein the translation stage moves the sample in a direction perpendicular to an axis of the first finite conjugate objective such that the sample can be moved to form an image from neighboring optical slices which can be stitched together to form a three-dimensional image of the sample.

9. The system of claim 1, further comprising a computing system configured to apply an affine transformation on a stack of acquired images, wherein application of the affine transformation is based on a tilt angle of the excitation plane.

* * * * *